(12) United States Patent
Park et al.

(10) Patent No.: US 9,183,625 B2
(45) Date of Patent: Nov. 10, 2015

(54) METHOD OF PROCESSING RADIOGRAPH AND APPARATUS FOR PROCESSING RADIOGRAPH USING THE METHOD IN WHICH HOUGH TRANSFORM AND RADON TRANSFORM PERFORMED ON IMAGE

(71) Applicant: SAMSUNG ELECTRONICS CO., LTD., Suwon-si (KR)

(72) Inventors: Jong-geun Park, Seoul (KR); Ho-kyung Kang, Seoul (KR); Jae-chool Lee, Suwon-si (KR); Hyun-seung Lee, Yongin-si (KR); Hae-kyung Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 233 days.

(21) Appl. No.: 13/728,418

(22) Filed: Dec. 27, 2012

(65) Prior Publication Data

US 2013/0163843 A1    Jun. 27, 2013

(30) Foreign Application Priority Data

Dec. 27, 2011    (KR) .................. 10-2011-0143924

(51) Int. Cl.
*G06K 9/00* (2006.01)
*G06T 7/00* (2006.01)

(52) U.S. Cl.
CPC .............. *G06T 7/0012* (2013.01); *G06T 7/0083* (2013.01); *G06T 7/0095* (2013.01); *G06T 2207/10116* (2013.01); *G06T 2207/20061* (2013.01); *G06T 2207/20132* (2013.01); *G06T 2207/30008* (2013.01)

(58) Field of Classification Search
None
See application file for complete search history.

(56) References Cited

U.S. PATENT DOCUMENTS

| 5,901,240 | A | 5/1999 | Luo et al. | |
| 6,775,399 | B1 | 8/2004 | Jiang | |
| 6,873,721 | B1* | 3/2005 | Beyerer et al. | 382/152 |
| 6,876,779 | B2* | 4/2005 | Rising, III | 382/276 |
| 7,697,662 | B2* | 4/2010 | Maltz et al. | 378/65 |
| 7,738,730 | B2* | 6/2010 | Hawley | 382/281 |
| 8,135,191 | B2* | 3/2012 | Rao et al. | 382/128 |
| 8,385,647 | B2* | 2/2013 | Hawley et al. | 382/173 |
| 2007/0172148 | A1* | 7/2007 | Hawley | 382/281 |
| 2009/0067576 | A1* | 3/2009 | Maltz | 378/65 |
| 2009/0238433 | A1* | 9/2009 | Rao et al. | 382/132 |
| 2013/0163843 | A1* | 6/2013 | Park et al. | 382/132 |

OTHER PUBLICATIONS

Ramakrishnan, A.; Thomas, C.; Tharakan, T.J., Spray characterisation using combined radon and hough transforms, Signal Processing, Informatics, Communication and Energy Systems (SPICES), 2015 IEEE International Conference on Year: Feb. 2015, pp. 1-5, DOI: 10.1109/SPICES.2015.7091435.*

Bhaskar, H.; Werghi, N.; Al Mansoori, S., Combined spatial and transform domain analysis for rectangle detection, Information Fusion (FUSION), 2010 13th Conference on, Year: Oct. 2010 pp. 1-7, DOI: 10.1109/ICIF.2010.5712096.*

\* cited by examiner

*Primary Examiner* — Tahmina Ansari
(74) *Attorney, Agent, or Firm* — Sughrue Mion, PLLC (57) ABSTRACT

Provided are an apparatus and a method for processing a radiograph which is capable of precisely detecting a region of interest. The apparatus includes: an inputter that outputs an input image obtained by irradiating radioactive rays; and a line detector that performs a Hough transform on the input image, senses at least one edge line based on the Hough-transformed input image, performs a Radon transform in a region in which the at least one edge line is sensed, and obtains an edge line of the at least one edge line as a first collimation line one based on a result of the Radon transform.

26 Claims, 11 Drawing Sheets
(5 of 11 Drawing Sheet(s) Filed in Color)

METHOD OF PROCESSING RADIOGRAPH AND APPARATUS FOR PROCESSING RADIOGRAPH USING THE METHOD IN WHICH HOUGH TRANSFORM AND RADON TRANSFORM PERFORMED ON IMAGE

CROSS-REFERENCE TO RELATED PATENT APPLICATION

This application claims priority from Korean Patent Application No. 10-2011-0143924, filed on Dec. 27, 2011 in the Korean Intellectual Property Office, the disclosure of which is incorporated herein in its entirety by reference.

BACKGROUND

1. Field

Apparatuses and methods consistent with exemplary embodiments relate to processing a radiograph, and more particularly, to processing a radiograph by precisely detecting a collimation line.

2. Description of the Related Art

A related art apparatus for processing a radiograph for detecting abnormalities in a human body by using radioactive rays is one of the most widely used medical imaging devices. Examples of medical imaging devices include a device for processing an x-ray radiograph that is obtained by irradiating x-rays to a human body part.

In order to obtain an x-ray radiograph, x-rays are irradiated to a human body. However, x-rays may be harmful to the human body. Thus, an exposure area of the human body is limited by using a collimator during radiography to prevent radioactive rays from being irradiated to undesired regions of the human body.

The related art apparatus for processing a radiograph obtains a region of interest (ROI) by removing collimated regions from the original x-ray image obtained by using the collimator. Radiography is performed and an ROI is obtained in order to diagnose a disease with a radiograph.

In order to obtain the ROI, the collimated regions should be removed. Particularly, collimation lines that discriminate the region exposed to the radioactive rays from the collimated lines are detected and the ROI is obtained by using the detected collimation lines.

The ROI can be precisely obtained by accurately obtaining the collimation lines. Thus, there is a need to develop a method of processing a radiograph which is capable of precisely obtaining collimation lines, and an apparatus for processing a radiograph therefor.

SUMMARY

One or more exemplary embodiments provide a method of processing a radiograph which is capable of precisely detecting a collimation line and an apparatus for processing a radiograph therefor.

One or more exemplary embodiments provide a method of processing a radiograph which is capable of accurately obtaining a region of interest (ROI) by precisely detecting four collimation lines and an apparatus for processing a radiograph therefor.

One or more exemplary embodiments also provide a method of processing a radiograph which is capable of quickly detecting a collimation line and an ROI and an apparatus for processing a radiograph therefor.

According to an aspect of an exemplary embodiment, there is provided an apparatus for processing a radiograph, the apparatus including: an inputter that outputs an input image obtained by irradiating radioactive rays; and a line detector that performs a Hough transform on the input image, senses at least one edge line based on the Hough-transformed input image, performs a Radon transform on a region in which the at least one edge line is sensed, and obtains an edge line of the at least one edge line as a first collimation line based on a result of the Radon transform.

The line detector may sense the at least one edge line by using a Hough peak value generated by the Hough transform.

The line detector may perform the Radon transform in the region in which the at least one edge line is sensed and obtains edge information of the input image based on the result of the Radon transform.

The line detector may choose one edge line corresponding to the edge information among the at least one edge line as the first collimation line.

The line detector may obtain a second collimation line based on the Hough peak value in a region that is spaced apart from the first collimation line at a predetermined distance, obtains a third collimation line based on the Hough peak value in a region that is spaced apart from the first collimation line by a predetermined phase, and obtains a fourth collimation line based on the Hough peak value in a region that is spaced apart from the third collimation line by the predetermined distance, wherein the first, second, third, and fourth collimation lines are obtained on a Hough domain.

The apparatus for processing a radiograph may further include a region of interest (ROI) detector that obtains an ROI based on the first to fourth collimation lines.

The predetermined phase may be +90 degrees or −90 degrees.

The predetermined distance may be greater than a vertical distance from a direct exposure region in the input image.

The line detector may include: a first detector that detects the first collimation line; a second detector that detects the second collimation line; a third detector that detects the third collimation line; and a fourth detector that detects the fourth collimation line.

The first detector may sense at least one Hough peak value in a Hough domain which is obtained by using a Hough transform of the input image, sense at least one edge line corresponding to the at least one Hough peak value, perform a Radon transform on a region in which the at least one edge line is sensed, and obtain the edge line corresponding to edge information of the input image obtained by using the result of the Radon transform as a first collimation line, and the second detector may sense a Hough peak value in a region that is spaced apart from the first collimation line by a predetermined distance in the Hough domain, sense at least one edge line corresponding to the Hough peak value, perform a Radon transform on a region in which the at least one edge line is sensed, and obtain one of the at least one edge line corresponding to edge information of the input image obtained by using the result of the Radon transform as a second collimation line.

The ROI detector may obtain the ROI formed by the first, second, third, and fourth collimation lines.

The inputter may include a radiographyer that irradiates x-rays to a subject for radiography to obtain the input image that is an original x-ray image.

According to an aspect of another exemplary embodiment, there is provided a method of processing a radiograph for detecting a region of interest (ROI) of the radiograph by using an apparatus for processing a radiograph, the method including: receiving an input image obtained by irradiating radioactive rays; performing a Hough transform on the input image and sensing at least one edge line based on the Hough-transformed input image; and performing a Radon transform on a region in which the at least one edge line is sensed and obtaining an edge line of the at least one edge line as a first collimation line based on a result of the Radon transform.

According to an aspect of another exemplary, there is provided a method of processing a radiograph for detecting a region of interest (ROI) of the radiograph, the method including: sensing at least one first edge line based on a Hough-transformed image; performing a first Radon transform on a region in which the at least one first edge line is sensed; and obtaining, as a first collimation line, an edge line of the at least one first edge line based on a result of the first Radon transform.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other features and advantages will become more apparent by describing in detail exemplary embodiments with reference to the attached drawings in which.

DETAILED DESCRIPTION OF EXEMPLARY EMBODIMENTS

Hereinafter, exemplary embodiments will be described in detail with reference to the accompanying drawing.

Expressions such as "at least one of," when preceding a list of elements, modify the entire list of elements and do not modify the individual elements of the list.

Figure 1:
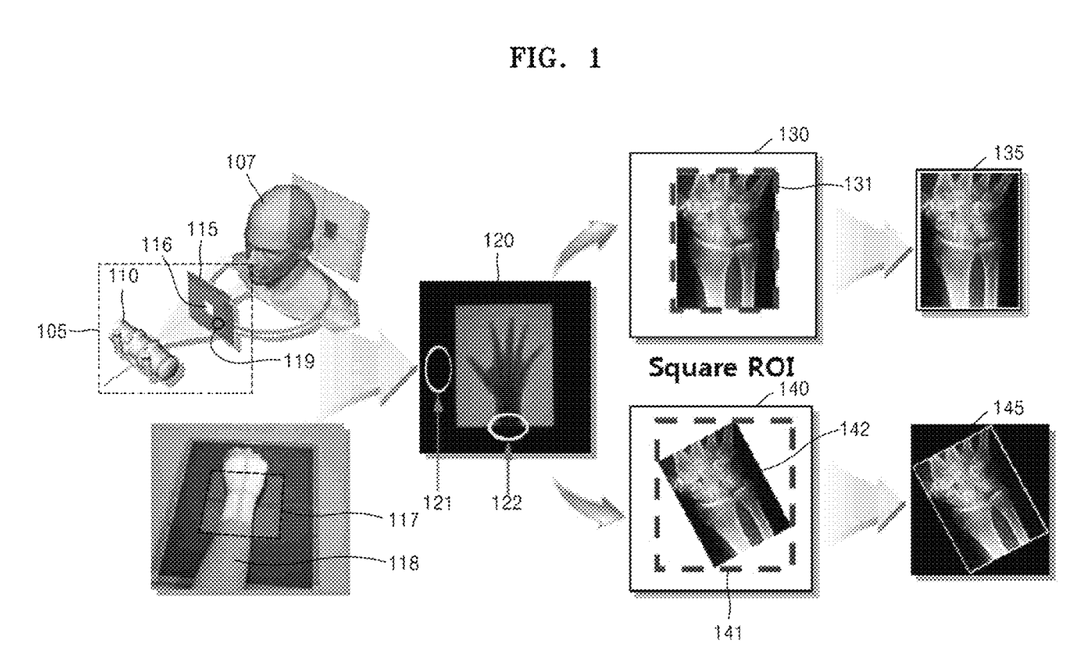
FIG. 1 shows an x-ray radiography and a detection of region of interest (ROI)

FIG. 1 shows an x-ray radiography and a detection of a region of interest (ROI).

Referring to FIG. 1, an x-ray radiography device 105 includes an x-ray generating unit 110 (e.g., x-ray generator) and a collimator 115. The x-ray generating unit 110 generates x-rays and irradiates the x-rays to a subject, for example, a human body.

The collimator 115 limits an x-ray exposure area of the human body. Particularly, the collimator 115 includes a transmission region 116 through which x-rays irradiated from the x-ray generating unit 110 pass and a blocking region 119 that blocks x-rays irradiated from the x-ray generating unit 110.

An x-ray radiograph may be obtained by using x-rays that pass through the transmission unit 116 (e.g., transmitter) and arrive at a human body part 107.

Alternatively, x-rays may be irradiated to a predetermined region 117 that includes a human body part 118 subjected to radiography. In this regard, the predetermined region 117 to which x-rays are directly irradiated refers to a direct exposure (DE) region.

According to the radiography described above, an original x-ray image 120 may be obtained. Due to the blocking region 119, the original x-ray image 120 includes a collimation region 121. A region of the original x-ray image 120 from which the collimation region 121 is removed is a region of interest (ROI). That is, the ROI corresponds to the transmission region 116, and the collimation region 121 corresponds to the blocking region 119. The acquisition of the ROI will be described in detail below. In addition, a frame for detecting the ROI refers to a square or rectangular ROI.

Referring to the image 130, the ROI may be obtained by acquiring a collimation line 131 that is an edge of the collimation region 121 and removing outer areas of the collimation line 131. In this regard, the collimation line 131 may be individually detected or collectively determined by using a single square or rectangular ROI. As shown in the image 130, if the rotation angle of the ROI is 0 degrees, an ROI 135 from which the collimation region 121 is removed may be obtained by using the square or rectangular ROI.

Referring to the image 140, if the rotation angle of the ROI is not 0 degrees, a region 142 corresponding to the DE region may be inclined as shown in FIG. 1 in the original x-ray image 140. If the square or rectangular ROI is applied to the image 140, the collimation line 131 is set as the edge of an ROI region 141, so that an ROI as shown in the image 145 may be obtained.

As shown in FIG. 1, if the ROI is extracted using the square or rectangular ROI when the rotation angle of the ROI is not 0 degrees, the collimation region 121 is not completely removed, so that the ROI may be obtained as shown in the image 145.

Hereinafter, an apparatus and a method for processing a radiograph which is capable of accurately extracting the collimation region 121 and the ROI from the original x-ray image 120, according to exemplary embodiments, will be described in detail with reference to FIGS. 2 to 12.

Figure 2:
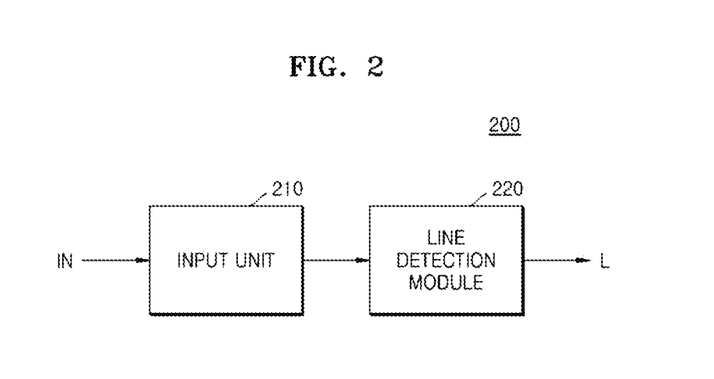
FIG. 2 is a block diagram illustrating an apparatus for processing a radiograph, according to an exemplary embodiment.

FIG. 2 is a block diagram illustrating an apparatus for processing a radiograph 200, according to an exemplary embodiment.

Referring to FIG. 2, the apparatus for processing a radiograph 200 includes an input unit 210 (e.g., inputter) and a line detection module 220 (e.g., line detector).

The input unit 210 outputs an input image obtained by irradiating radioactive rays. The input image is an original x-ray image from which the collimation region 121 is not removed. Referring to FIG. 2, the input unit 210 receives an input image IN from an external device and transfers the received input image IN to the line detection module 220.

The line detection module 220 performs a Hough transform on the input image IN, senses at least one edge line based on the Hough-transformed input image IN, performs a Radon transform on a region in which at least one edge line is detected, and obtains one of the edge lines as a first collimation line based on a result of the Radon transform. In this regard, the first collimation line is one of four edges, i.e., boundaries, of the collimation region 121.

Figure 3:
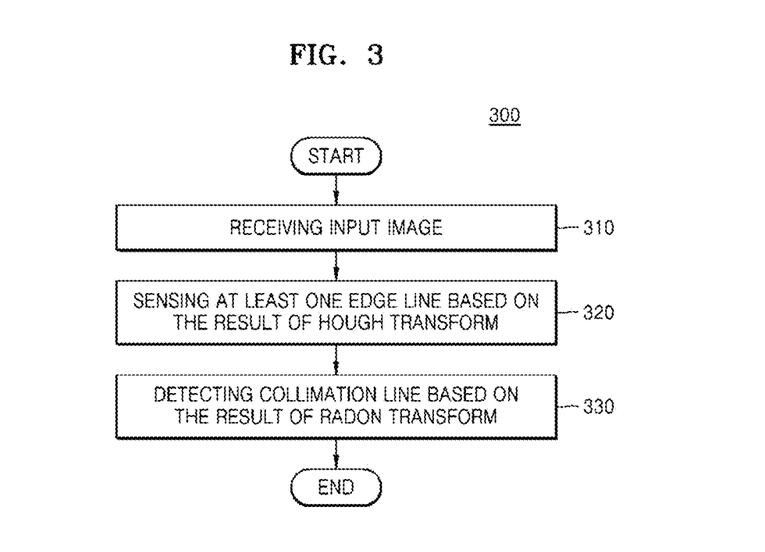
FIG. 3 is a flowchart illustrating a method of processing a radiograph, according to an exemplary embodiment.

FIG. 3 is a flowchart illustrating a method of processing a radiograph 300, according to an exemplary embodiment. Operations of the method of processing a radiograph 300, according to the present exemplary embodiment, are the same as or similar to those of the apparatus for processing a radiograph 200 described above with reference to FIG. 2. Thus, repeated descriptions thereof are omitted. In addition, the method of processing a radiograph 300 may be performed by the apparatus for processing a radiograph 200 according to an exemplary embodiment. Particularly, the method of processing a radiograph 300 is a method of processing a radiograph for detecting an ROI from the radiograph by using the apparatus for processing a radiograph 200.

The method of processing a radiograph 300 includes receiving an input image IN obtained by irradiating x-rays, which are radioactive rays (operation 310). Operation 310 may be performed by the line detection module 220. Particularly, the input image IN is output from the input unit 210, and the line detection module 220 receives the input image IN from the input unit 210.

The input image IN received in operation 310 is Hough-transformed, and at least one edge line is sensed based on the Hough-transformed input image IN (operation 320). Operation 320 may be performed by the line detection module 220.

A Radon transform is performed on a region in which the at least one edge line is sensed in operation 320, and one edge line from among the at least one edge line sensed in operation 320 is chosen as a first collimation line based on the result of the Radon transform (operation 330). Operation 330 may be performed by the line detection module 220.

Figure 4:
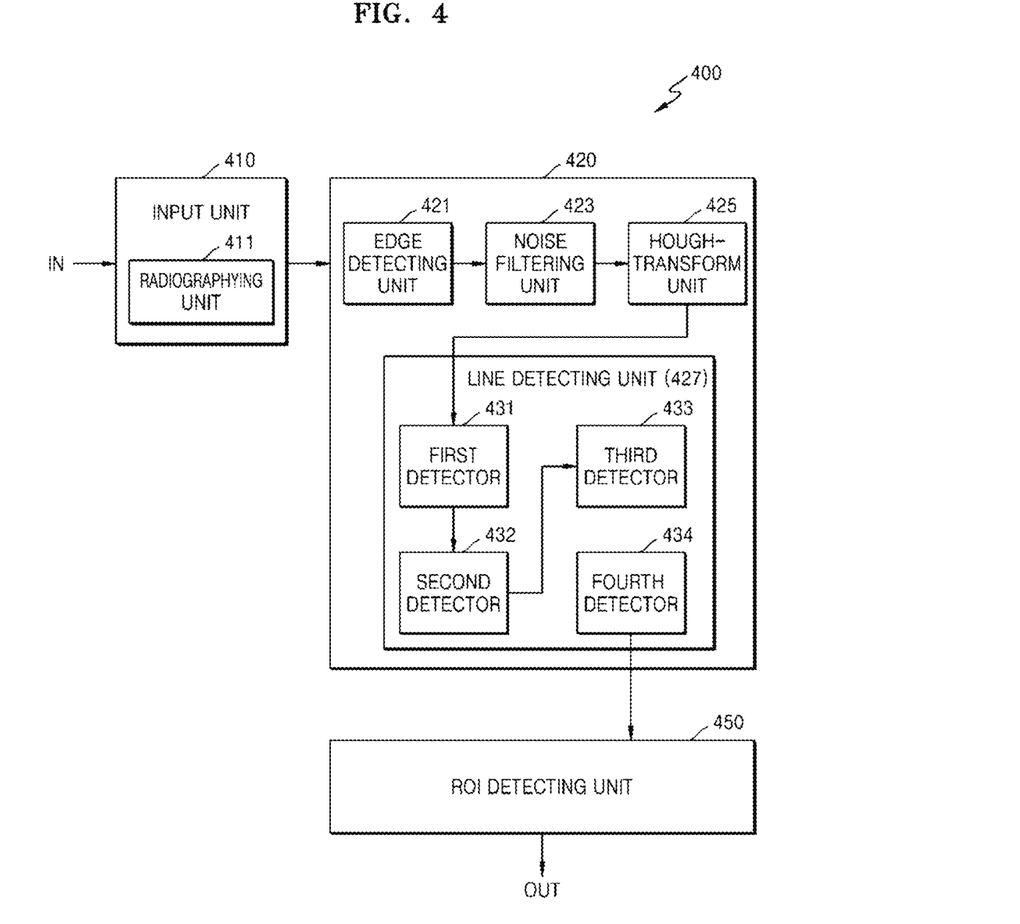
FIG. 4 is a block diagram illustrating an apparatus for processing a radiograph, according to another exemplary embodiment.

FIG. 4 is a block diagram illustrating an apparatus for processing a radiograph 400, according to another exemplary embodiment. An input unit 410 and a line detection module 420 of the apparatus for processing a radiograph 400 respectively correspond to the input unit 210 and the line detection module 220 of the apparatus for processing a radiograph 200 described above. Thus, repeated descriptions thereof are omitted. In addition, the apparatus for processing a radiograph 400 may further include an ROI detecting unit 450 (e.g., ROI detector), as compared to the apparatus for processing a radiograph 200 described above.

Figure 5:
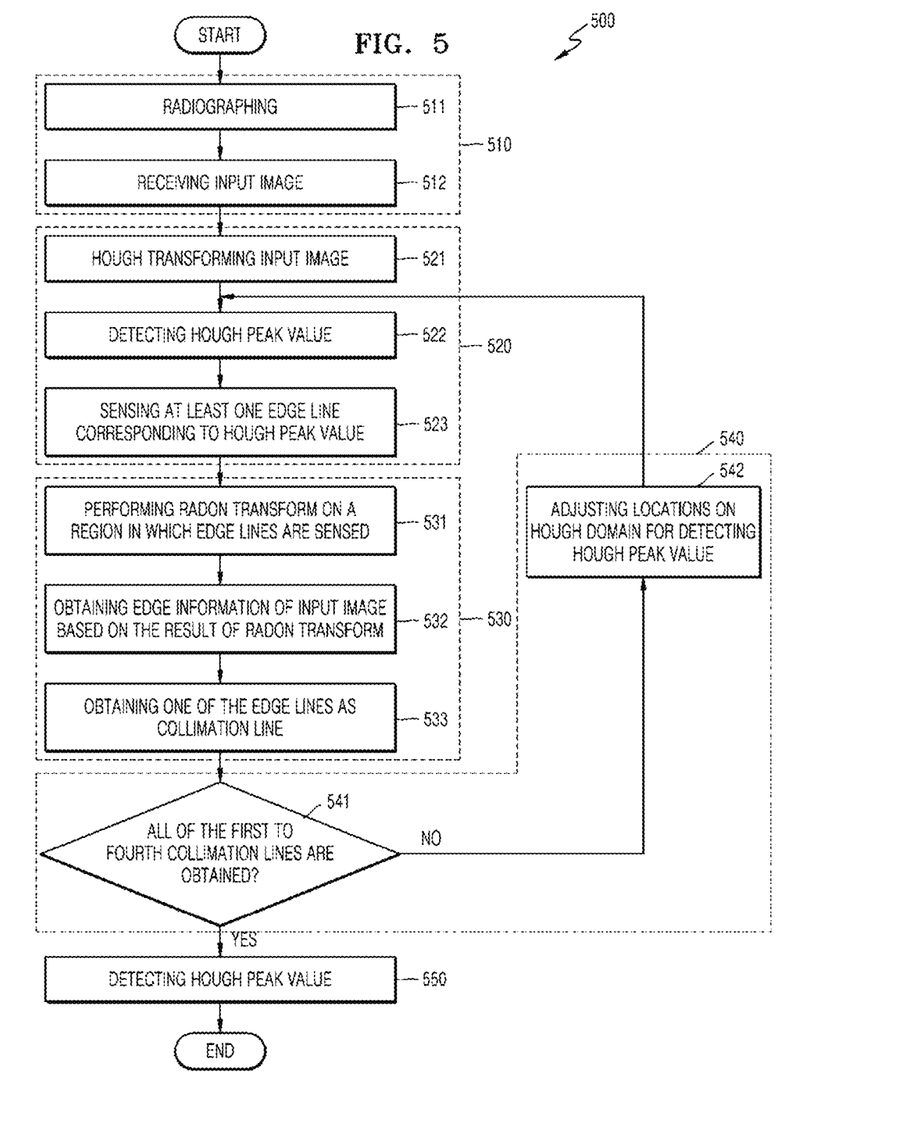
FIG. 5 is a flowchart illustrating a method of processing a radiograph, according to another exemplary embodiment.

FIG. 5 is a flowchart illustrating a method of processing a radiograph 500 according to another exemplary embodiment. The method of processing a radiograph 500 may be performed by the apparatus for processing a radiograph 400 of FIG. 4. In addition, operations of the method of processing a radiograph 500 are the same as or similar to those of the method of processing a radiograph 300. In addition, operations 510, 520, and 530 of the method of processing a radiograph 500 respectively correspond to operations 310, 320, and 330 of the method of processing a radiograph 300. Thus, repeated descriptions thereof are omitted.

The apparatus for processing a radiograph 400 and the method of processing a radiograph 500, according to one or more other exemplary embodiments, will be described in detail with reference to FIGS. 4 and 5.

Referring to FIG. 4, the input unit 410 outputs an input image IN obtained by irradiating radioactive rays (operation 510).

The input unit 410 may include a radiographying unit 411 (e.g., radiographyer). The radiographying unit 411 irradiates x-rays to a human body subjected to radiography to obtain an input image IN that is an original x-ray image. Particularly, the radiographying unit 411 corresponds to the x-ray radiographing device 105 described above with reference to FIG. 1.

If the input unit 410 includes the radiographying unit 411, the input unit 410 produces the input image IN, instead of receiving the input image IN from an external device (not shown), and transfers the input image IN to the line detection module 420. On the other hand, if the input unit 410 does not include the radiographying unit 411, the input unit 410 receives the input image IN from an external device and transmits the input image IN to the line detection module 420. The input image IN output from the input unit 410 will be described in more detail with reference to FIG. 6.

Figure 6:
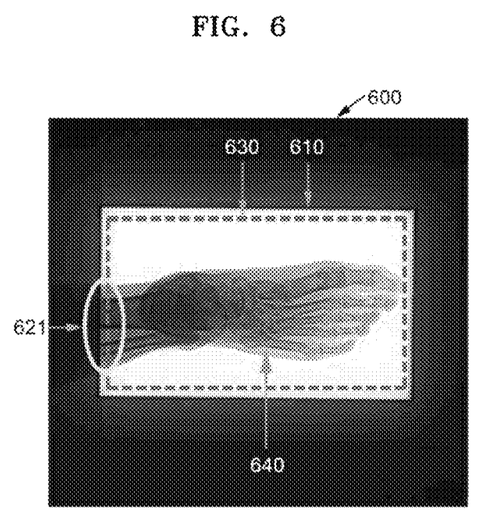
FIG. 6 is an input image that is output from an input unit of the apparatus for processing a radiograph shown in FIG. 4, according to an exemplary embodiment.

FIG. 6 is an input image 600 that is output from the input unit 410 of the apparatus for processing a radiograph 400 shown in FIG. 4, according to an exemplary embodiment.

Referring to FIG. 6, the input image 600 includes a region 610 obtained by irradiating x-rays to a part of a human body 640 (highlight C) and a black region corresponding to the collimator. The line detection module 420 detects collimation lines 630 that are edges between the image region 610 and the black region corresponding to the collimator.

A general apparatus for processing a radiograph detects collimation lines using a brightness difference of an image, a line extraction method, or the like. However, it is difficult to precisely detect the collimation lines by using the brightness difference of the image, since there is a slight brightness difference at overlap regions 621 between the black region and the human body image 640. In FIG. 1, a collimation line cannot be precisely detected in a region 122 by using the brightness difference.

In the method of processing a radiograph 500, operation 510 may include operation 511 in which a radiograph is obtained by irradiating radioactive rays to a human body subjected to radiography and operation 512 in which the obtained image that is an input image is output. In operation 511, the radiography may be performed by the radiographying unit 411 or a radiographic imaging device (not shown) disposed outside of the apparatus for processing a radiograph 400. Operation 512 may be performed by the input unit 410.

The line detection module 420 may include an edge detecting unit 421 (e.g., edge detector), a noise filtering unit 423 (e.g., noise filterer), a Hough-transform unit 425 (e.g., Hough-transformer), and a line detecting unit 427 (e.g., line detector).

The edge detecting unit 421 transforms the input image IN into an edge image to sense edge lines of the input image IN. For example, the edge detecting unit 421 may include a Canny edge detector (not shown). An edge image produced by the edge detecting unit 421 will be described below with reference to FIG. 7A.

The noise filtering unit 423 removes noise components that exist in an edge image generated by the edge detecting unit 421 and removes edge lines corresponding to the noise components. An image from which the noise is removed and produced by the noise filtering unit 423 will be described below with reference to FIG. 7B.

Figure 7A:
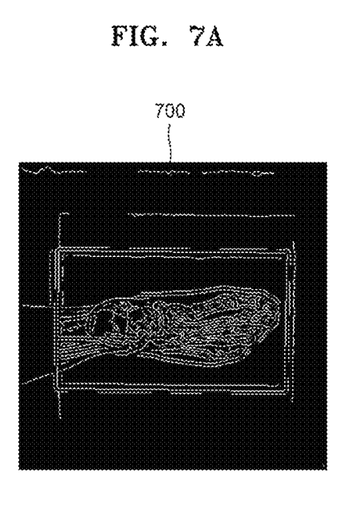
FIGS. 7A and 7B are images that are generated or used in a line detection module of the apparatus for processing a radiograph shown in FIG. 4, according to an exemplary embodiment.
Figure 7B:
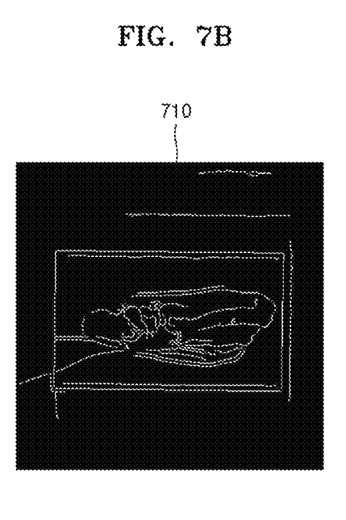

FIGS. 7A and 7B are images that are generated or used in the line detection module 420 of the apparatus for processing a radiograph 400 shown in FIG. 4, according to an exemplary embodiment. Particularly, FIG. 7A shows an edge image 700 generated by the edge detecting unit 421. FIG. 7B shows an image output from the noise filtering unit 423.

Referring to FIG. 7A, the edge image 700 generated by the edge detecting unit 421 includes all edge lines that are contained in the input image 600. FIG. 7A shows a Canny edge image.

Referring to FIG. 7B, the noise-filtered image 710 produced by the noise filtering unit 423 does not include edge lines corresponding to the noise components.

The line detecting unit 427 detects at least one collimation line. In more detail, the line detecting unit 427 detects four collimation lines used to confirm the ROI. Particularly, the line detecting unit 427 may include first to fourth detectors 431, 432, 433, and 434. The first to fourth detectors 431, 432, 433, and 434 detect four collimation lines used to confirm the ROI, respectively.

In the method of processing a radiograph 500, operation 520 may include operations 521, 522, and 523.

The line detection module 420 performs a Hough transform on the input image IN (operation 521), and detects at least one Hough peak value (operation 522). The Hough peak value may be detected in a Hough domain that is generated as a result of the Hough transform.

At least one edge line may be sensed by using the detected Hough peak value (operation 523). Particularly, the line detecting unit 427 senses at least one edge line by using the Hough peak value of the Hough domain.

Specifically, if the line detection module 420 includes the edge detecting unit 421 and the noise filtering unit 423, the line detecting unit 427 may perform a Hough transform on the noise-removed image 710 that is obtained by performing an edge conversion on the input image IN and removing the noise components. The Hough transform is a technique for sensing edge lines, and the edge lines are expressed by using rho r and theta. A plane represented by rho r and theta refers to the Hough domain.

Particularly, the line detecting unit 427 senses rho r and theta points having Hough peak values in the Hough domain and senses edge lines corresponding to the sensed rho r theta points.

The Hough transform and the detection of Hough peak values are understood by one of ordinary skill in the art, and thus, detailed descriptions thereof are omitted herein.

The Hough-transformed input image, which is output from the line detection module 420, particularly, the Hough-transform unit 425, will be described in detail with reference to FIG. 8.

Figure 8:
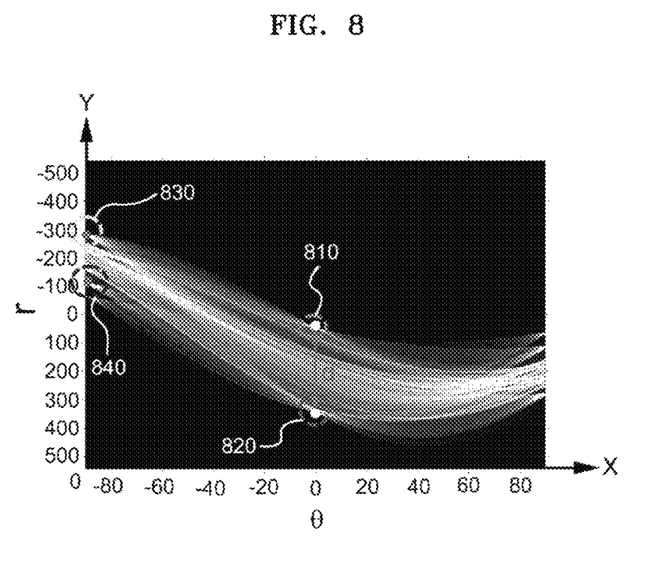
FIG. 8 is a graph for illustrating a Hough-transformed input image according to an exemplary embodiment.

FIG. 8 is a graph for illustrating a Hough-transformed input image according to an exemplary embodiment.

Referring to FIG. 8, the x-axis shows the rho r values, and the y-axis shows the theta values, which range from −90 degrees to 90 degrees. If the input image IN or the noise-removed image 710 corresponding to the input image IN is Hough-transformed, it may be represented in the Hough domain as shown in FIG. 8. Points 810, 820, 830, and 840 show rho and theta points where the Hough peak values exist. The Hough peak values are detected by the line detection module 420, particularly, by the Hough-transform unit 425 or the line detecting unit 427. Operations of sensing at least one edge line by using the Hough peak values by the line detection module 420 will be described in detail with reference to FIG. 9. In addition, hereinafter, it will be described that the detection of the collimation lines is performed by the line detecting unit 427, for example, by at least one of the first to fourth detectors 431, 432, 433, and 434. The detection of the first collimation line will be described, and then the detection of the first collimation line by the first detector 431 will be described.

Figure 9:
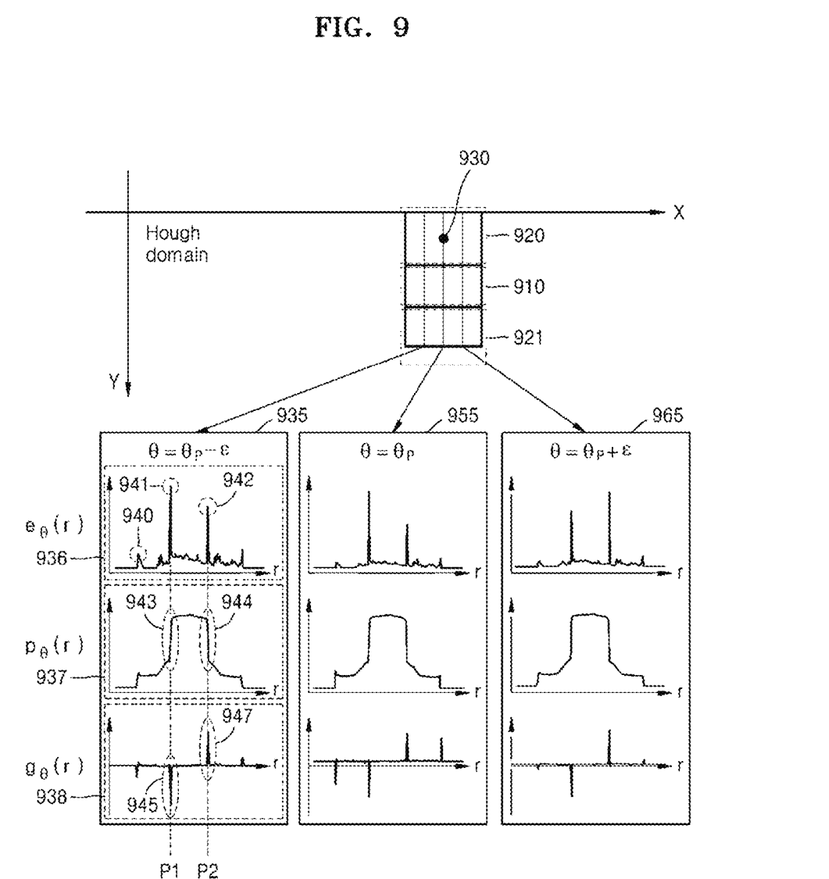
FIG. 9 is a diagram for describing operations of a line detection module of the apparatus for processing a radiograph shown in FIG. 4, according to an exemplary embodiment.

FIG. 9 is a diagram for describing line operations of the line detection module 420 of the apparatus for processing a radiograph 400 shown in FIG. 4, according to an exemplary embodiment.

Referring to FIG. 9, the line detection module 420 detects a point 930 having a Hough peak value in the Hough domain. Function e(r) shown in FIG. 9 represents edge information with respect to changes of rho r values at a predetermined theta value. Function p(r) represents projection information obtained by performing a Radon transform on the input image at a predetermined theta value. Function g(r) represents information obtained by applying a gradient to the p(r) function with respect to the input image.

The Hough domain graph shown in FIG. 9 corresponds to the Hough domain graph shown in FIG. 8. The first detector 431 detects as the first collimation line one of the edge lines located at a peripheral region 920 from which at least one Hough value is detected. Particularly, the first collimation line may be detected by using the edge information obtained from the Hough domain and the Radon transform. In this regard, the size of the peripheral region 920 may vary according to the model number, signal processing performance, the size of a memory of the apparatus for processing a radiograph 400, or the like. For example, if the apparatus for processing a radiograph 400 has a fast and accurate signal processing rate, the edge lines may be more precisely detected by enlarging the peripheral region 920.

In particular, the line detection module 420, e.g., the first detector 431, may sense at least one edge line by using the Hough peak values sensed in the Hough domain (operation 523).

Referring to the function e(r) graph 936, the function e(r) graph 936 is obtained by varying the rho r values of the peripheral region 920 at the point 930 where the Hough peak value is sensed in the Hough domain. According to the function e(r), the edge line of the input image IN is represented by the Hough peak value. In other words, there are very high possibilities that the edge lines exist at points 940, 941, and 942. Thus, at least one edge line having rho r and theta values corresponding to the points 940, 941, and 942 is sensed.

The line detection module 420, e.g., the first detector 431, performs a Radon transform on a region where at least one edge line is sensed (operation 531). Then, edge information of the input image IN is obtained based on the result of the Radon transform (operation 532). In this regard, the at least one edge line may be sensed based on the function e(r). The edge information may be obtained from the function p(r).

Referring the function graph p(r) 937, if the Radon transform is performed on the input image IN in which at least one edge line is sensed, the slope of the function p(r) graph rapidly changes at the edge line. In this regard, the rho r and theta values corresponding to points 943 and 944 showing rapid changes in slope may be obtained as the edge information.

Furthermore, the line detection module 420, e.g., the first detector 431, obtains the function g(r) graph 938 in order to improve accuracy of the edge information and determines whether the peak points of the function g(r) are the same as the points 943 and 944. Particularly, if the peak points of the function g(r) are the same as the points 943 and 944, it is determined that there are edge lines, so that the edge information may be generated.

The line detection module 420, e.g., the first detector 431, may choose as the first collimation line the edge line corresponding to the edge information obtained in operation 532 among the at least one edge line sensed in operation 523. Specifically, in the function e(r) graph 936, the edge line having the same rho r values as the points 943 and 944 of the function p(r) graph 937 among the edge lines corresponding to the points 940, 941, and 942 may be chosen as the collimation line. That is, the edge line having the same rho r and theta values as the points P1 and P2 may be detected as the collimation line.

For example, the edge line having the same rho r and theta values as the point P1 may be chosen as the first collimation line, and the edge line having the same rho r and theta values as the point P2 may be chosen as the second collimation line that is parallel to the first collimation line.

In addition, the line detection module 420, e.g., the first detector 431, may sense the collimation lines of operations 523, 531, 532, and 533 by changing the theta values as shown in blocks 935, 955, and 965.

The line detection module 420 obtains a second collimation line based on the Hough peak value 820 of a region that is spaced apart from the first collimation line at a predetermined distance d of FIG. 8.

In addition, the line detection module 420 obtains a third collimation line based on the Hough peak value of a region that is spaced apart from the first collimation line by a predetermined phase. Then, the line detection module 420 obtains a fourth collimation line based on the Hough peak value of a region that is spaced apart from the third collimation line by a predetermined distance d of FIG. 8.

Particularly, the second collimation line may be sensed by the second detector 432, the third collimation line may be sensed by the third detector 433, and the fourth collimation line may be sensed by the fourth detector 434.

In addition, the first, second, third, and fourth collimation lines are obtained in the Hough domain.

Operations of obtaining the second to fourth collimation lines are the same as, or similar to, those of the first collimation line. Specifically, the second and fourth collimation lines may be obtained by repeating operations of 523, 531, 532, and 533 described with reference to FIGS. 5 and 10.

In this regard, the predetermined phase may be +90 or −90 degrees. The ROI formed by the first to fourth collimation lines has a square or rectangular shape. Accordingly, one collimation line is perpendicular to another collimation line. Thus, the third collimation line is sensed at a point having a theta value that is 90 degrees greater or less than the theta value of the point having the first collimation line and the same rho r value as the point having the first collimation line. Particularly, referring to FIG. 8, at the point 930 having a theta value that is 90 degrees less than that of the point 810 having the first collimation line, the Hough peak value for sensing the third collimation line is detected.

In addition, the predetermined distance d is the same as or greater than a vertical distance of the DE region corresponding to the input image IN. The DE and the predetermined distance d will be described in detail with reference to FIG. 10.

Figure 10:
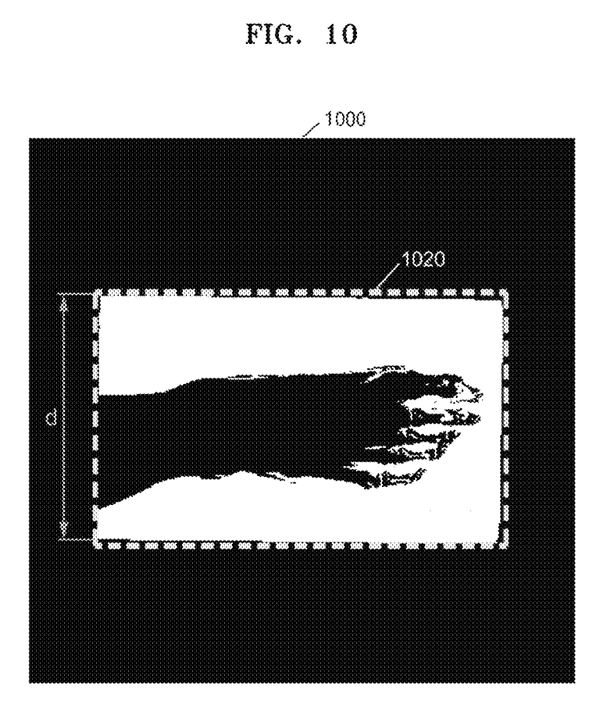
FIG. 10 illustrates an image obtained by direct exposure (DE) corresponding to an input image.

FIG. 10 illustrates an image obtained by DE corresponding to an input image 1000, according to an exemplary embodiment.

Referring to FIG. 10, the input image 1000 includes a blocking region that is blocked by the collimator 115 and a DE region 1020 corresponding to the transmission region 116 of the collimator 115. The DE region 1020 may be coarsely sensed according to the brightness changes in the input image 1000, and the vertical distance d of the DE region 1020 may also be obtained.

In addition, the vertical distance d of FIG. 10 corresponds to the predetermined distance d between the points 810 and 820 of FIG. 8. Particularly, the Hough peak value for sensing the second collimation line is sensed at the point 820 that is spaced apart from the point 810 corresponding to the first collimation line in the Hough domain by the predetermined distance d for the y-axis representing the rho r.

The method of processing a radiograph 500 may further include operation 540 following operation 530.

In particular, the method of processing a radiograph 500 determines whether all of the first to fourth collimation lines are obtained (operation 541) when the first collimation line is sensed in operation 530.

Figure 11A:
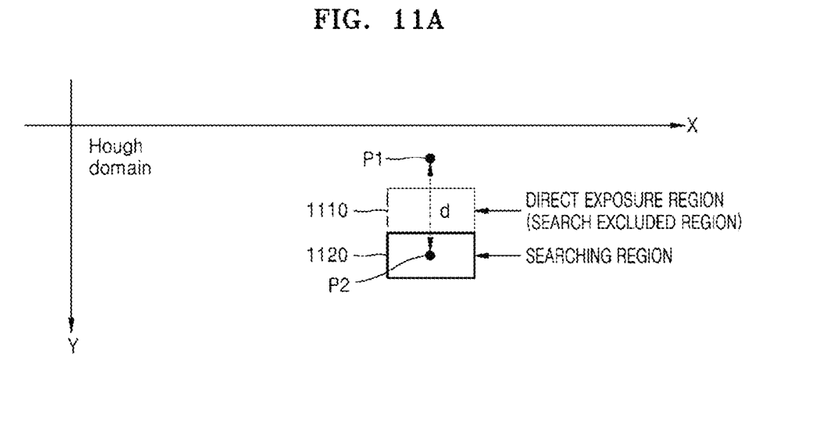
FIGS. 11A and 11B are diagrams for describing line operations of a line detection module of the apparatus for processing a radiograph shown in FIG. 4, according to an exemplary embodiment.
Figure 11B:
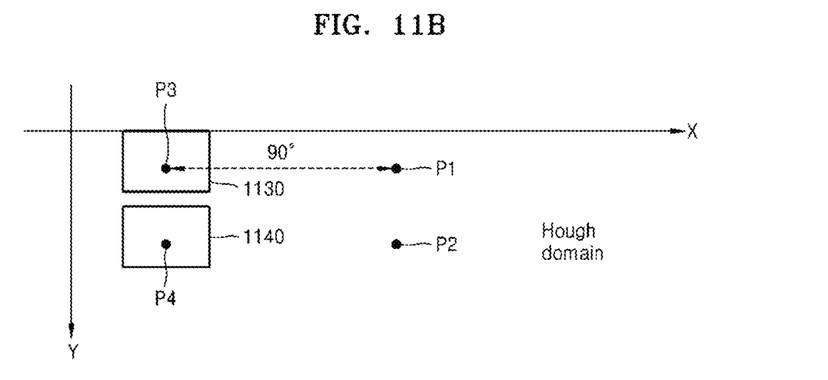

Then, if all of the first to fourth collimation lines are not obtained, the method returns to operation 522 by adjusting locations of regions 1120 or 1130 of FIG. 11 for detecting Hough peak values (operation 542).

Operations 541 and 542 may be performed by the line detecting unit 427.

The sensing of the first to fourth collimation lines will be described in more detail with reference to FIGS. 11A and 11B.

FIGS. 11A and 11B are diagrams for describing line operations of the line detection module 420 of the apparatus for processing a radiograph 400 shown in FIG. 4, according to an exemplary embodiment. FIG. 11A is a diagram for describing operations of sensing the second collimation line by using the first collimation line. FIG. 11B is a diagram for describing operations of sensing the third collimation line by using the first collimation line.

Referring to FIG. 11A, the first detector 431 senses at least one Hough peak value in a Hough domain which is obtained by performing a Hough transform on the input image and at least one edge line corresponding to the at least one Hough peak value. Then, the first detector 431 performs the Radon transform on the region where the at least one edge line is sensed, and chooses, as the first collimation line, one edge line corresponding to the edge information of the input image obtained using the Radon transform result among the sensed at least one edge line. FIG. 11A shows the point corresponding to the first collimation line in the Hough domain as P1.

The second detector 432 senses the Hough peak values in the region 1120 spaced apart from the point P1 corresponding to the first collimation line by a predetermined distance d, and senses at least one edge line corresponding to the Hough peak value. Then, the second detector 432 performs the Radon transform on the region where the at least one edge line is sensed, and chooses, as the second collimation line, one edge line corresponding to the edge information of the input image obtained using the result of the Radon transform. FIG. 11B shows the point corresponding to the second collimation line in the Hough domain as P2.

Referring to FIG. 11B, the third detector 433 senses the Hough peak values in the region 1130 spaced apart from the point P1 corresponding to the first collimation line by a predetermined phase, e.g., by −90 degrees, and senses at least one edge line corresponding to the Hough peak value. Then, the third detector 433 performs the Radon transform on the region where the at least one edge line is sensed, and chooses, as the third collimation line, one edge line corresponding to the edge information of the input image obtained using the result of the Radon transform. FIG. 11B shows the point corresponding to the third collimation line in the Hough domain as P3.

The fourth collimation line may be sensed by searching a region spaced apart from the point P3 corresponding to the third collimation line by a predetermined distance d. Alternatively, the fourth collimation line may be sensed by searching a region spaced apart from the point P2 corresponding to the second collimation line by a predetermined phase, e.g., by −90 degrees.

Particularly, in the Hough domain, a Hough peak value is sensed in a region 1140 that is spaced apart from the third collimation line by a predetermined distance d. At least one edge line corresponding to the sensed Hough peak value is sensed. Then, a Radon transform is performed on a region where the edge line is sensed, and the edge line corresponding to the edge information of the input image obtained using the result of the Radon transform is chosen as the fourth collimation line.

The ROI detecting unit 450 obtains the ROI formed of the first to fourth collimation lines sensed by the line detecting unit 427. The ROI will be described with reference to FIG. 12.

Figure 12:
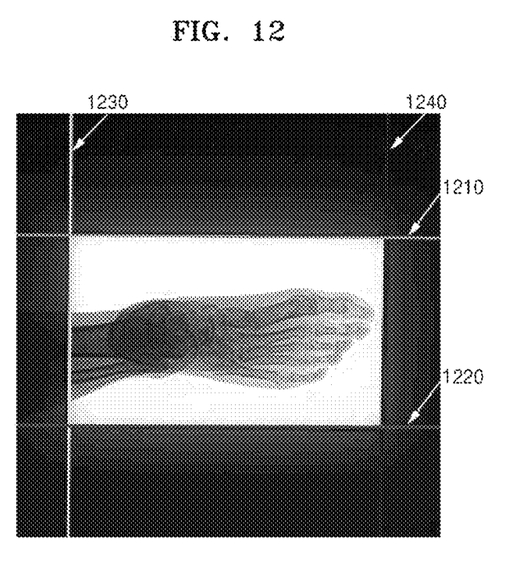
FIG. 12 illustrates a collimation line and an ROI detected by an apparatus for processing a radiograph, according to an exemplary embodiment.

FIG. 12 illustrates collimation lines and an ROI detected by an apparatus for processing a radiograph, according to an exemplary embodiment.

Referring to FIG. 12, the line detecting unit 427 obtains a first collimation line 1210, a second collimation line 1220, a third collimation line 1230, and a fourth collimation line 1240.

The ROI detecting unit 450 produces an output image OUT including only the ROI by combining the first to fourth collimation lines 1210, 1220, 1230, and 1240.

Technical concepts of the method of processing a radiograph 500, according to another exemplary embodiment, are the same as, or similar to, those of the apparatus for processing a radiograph 400, according to another exemplary embodiment, and thus, repeated descriptions thereof are omitted.

According to a method and an apparatus for processing a radiograph, according to other exemplary embodiments, edge lines for detecting collimation lines are sensed by using the Hough transform, and then, the collimation lines are confirmed by using a Radon transform. Thus, the collimation lines can be precisely detected.

In addition, although the Radon transform has high accuracy, the transform may take a long time and may have a complicated operation process. According to a method and apparatus for processing a radiograph, according to other exemplary embodiments, the Radon transform is not performed on the entire input image. Instead, the collimation lines are detected by performing the Radon transform only on a region in which the edge lines are sensed by using the Hough transform. Accordingly, a sensing time may be reduced while accuracy is maintained, when compared to performing the Radon transform on the entire input image. Thus, the collimation line and the ROI may be quickly and accurately detected.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs.

Moreover, it is understood that in exemplary embodiments, one or more units and modules of the above-described apparatuses can include circuitry, a processor, a microprocessor, etc., and may execute a computer program stored in a computer-readable medium.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. An apparatus for processing a radiograph, the apparatus comprising:
   an inputter which outputs an image obtained by irradiating radioactive rays; and
   a line detector which performs a Hough transform on the image output from the inputter, senses at least one first edge line based on the Hough-transformed input image, performs a first Radon transform on a region in which the at least one first edge line is sensed, and obtains, as a first collimation line, an edge line from among the at least first one edge line based on a result of the first Radon transform.

2. The apparatus for processing a radiograph of claim 1, wherein the line detector senses the at least first one edge line by using a first Hough peak value generated by the Hough transform.

3. The apparatus for processing a radiograph of claim 2, wherein the line detector performs the first Radon transform on the region in which the at least one first edge line is sensed and obtains edge information of the image based on the result of the first Radon transform.

4. The apparatus for processing a radiograph of claim 3, wherein the line detector chooses, as the first collimation line, one edge line corresponding to the obtained edge information among the at least one first edge line.

5. The apparatus for processing a radiograph of claim 1, wherein:
   the line detector obtains a second collimation line based on a second Hough peak value in a region spaced apart from the first collimation line by a predetermined distance, obtains a third collimation line based on a third Hough peak value in a region spaced apart from the first collimation line by a predetermined phase, and obtains a fourth collimation line based on a fourth Hough peak value in a region spaced apart from the third collimation line by the predetermined distance; and
   the first collimation line, the second collimation line, the third collimation line, and the fourth collimation line are obtained on a Hough domain.

6. The apparatus for processing a radiograph of claim 5, further comprising a region of interest (ROI) detector which obtains an ROI based on the obtained first collimation line, the obtained second collimation line, the obtained third collimation line, and the obtained fourth collimation line.

7. The apparatus for processing a radiograph of claim 5, wherein the predetermined phase is +90 degrees or −90 degrees.

8. The apparatus for processing a radiograph of claim 5, wherein the predetermined distance is greater than a vertical distance from a direct exposure region in the image.

9. The apparatus for processing a radiograph of claim 5, wherein the line detector comprises:
   a first detector which detects the first collimation line;
   a second detector which detects the second collimation line;

a third detector which detects the third collimation line; and a fourth detector which detects the fourth collimation line.

10. The apparatus for processing a radiograph of claim 9, wherein:

the first detector senses a first Hough peak value in the Hough domain which is obtained by using the Hough transform of the image, senses the at least one first edge line corresponding to the at least one first Hough peak value, performs the first Radon transform on the region in which the at least first one edge line is sensed, and obtains, as the first collimation line, the edge line corresponding to edge information of the image obtained by using the result of the first Radon transform; and the second detector senses the second Hough peak value in the region that is spaced apart from the first collimation line by the predetermined distance in the Hough domain, senses at least one second edge line corresponding to the second Hough peak value, performs a second Radon transform on a region in which the at least one second edge line is sensed, and obtains, as the second collimation line, an edge line of the at least one second edge line corresponding to edge information of the image obtained by using the result of the second Radon transform.

11. The apparatus for processing a radiograph of claim 6, wherein the ROI detector obtains the ROI formed by the first collimation line, the second collimation line, the third collimation line, and the fourth collimation line.

12. The apparatus for processing a radiograph of claim 1, wherein the inputter comprises a radiographer which irradiates x-rays to a subject for radiography to obtain the image that is an original x-ray image.

13. A method of processing a radiograph for detecting a region of interest (ROI) of the radiograph, the method comprising:

receiving an image obtained by irradiating radioactive rays;

performing a Hough transform on the image and sensing at least one first edge line based on the Hough-transformed image;

performing a first Radon transform on a region in which the at least one first edge line is sensed; and obtaining, as a first collimation line, an edge line from among the at least one first edge line based on a result of the first Radon transform, wherein the image is obtained by irradiating radioactive rays.

14. The method of processing a radiograph of claim 13, wherein the sensing the at least one first edge line comprises sensing the at least one first edge line by using a first Hough peak value generated by the Hough transform.

15. The method of processing a radiograph of claim 14, wherein the obtaining, as the first collimation line, the edge line of the at least one first edge line comprises:

performing the first Radon transform on the region in which the at least one first edge line is sensed; and obtaining edge information of the image based on the result of the first Radon transform.

16. The method of processing a radiograph of claim 15, wherein the obtaining, as the first collimation line, the edge line of the at least one first edge line further comprises obtaining, as the first collimation line, one edge line of the at least one first edge line corresponding to the edge information.

17. The method of processing a radiograph of claim 14, further comprising:

determining whether all of collimation lines used to form the ROI are obtained; and adjusting a location of a Hough domain in the image to detect the first Hough peak value, and repeating the sensing, the performing the Radon transform, and the obtaining, if all of the collimation lines used to form the ROI are not obtained.

18. The method of processing a radiograph of claim 13, further comprising:

obtaining a second collimation line based on a second Hough peak value in a region spaced apart from the first collimation line by a predetermined distance;

obtaining a third collimation line based on a third Hough peak value in a region that is spaced apart from the first collimation line by a predetermined phase; and obtaining a fourth collimation line based on a fourth Hough peak value in a region that is spaced apart from the third collimation line by the predetermined distance, wherein the first collimation line, the second collimation line, the third collimation line, and the fourth collimation line are obtained in a Hough domain.

19. The method of processing a radiograph of claim 18, further comprising obtaining the ROI based on the obtained first collimation line, the obtained second collimation line, the obtained third collimation line, and the obtained fourth collimation line.

20. The method of processing a radiograph of claim 18, wherein the predetermined phase is +90 degrees or −90 degrees, and the predetermined distance is greater than a vertical distance from a direct exposure region corresponding to the image.

21. The method of processing a radiograph of claim 18, wherein the obtaining the second collimation line comprises:

sensing the second Hough peak value in the region that is spaced apart from the first collimation line by the predetermined distance in the Hough domain;

sensing at least one second edge line corresponding to the second Hough peak value;

performing a second Radon transform on a region in which the at least one second edge line is sensed; and obtaining, as the second collimation line, an edge line, of the at least one second edge line, corresponding to edge information of the image obtained by using a result of the second Radon transform.

22. The method of processing a radiograph of claim 18, wherein the obtaining the third collimation line comprises:

sensing the third Hough peak value in the region that is spaced apart from the first collimation line by the predetermined phase in the Hough domain;

sensing at least one third edge line corresponding to the third Hough peak value;

performing a third Radon transform on a region in which the at least one third edge line is sensed; and obtaining, as the third collimation line, an edge line, of the at least one third edge line, corresponding to edge information of the image obtained by using a result of the third Radon transform.

23. The method of processing a radiograph of 18, wherein the obtaining the fourth collimation line comprises:

sensing the fourth Hough peak value in the region that is spaced apart from the third collimation line by the predetermined distance in the Hough domain;

sensing at least one fourth edge line corresponding to the fourth Hough peak value;

performing a fourth Radon transform on a region in which the at least one fourth edge line is sensed; and obtaining, as the fourth collimation line, an edge line, of the at least one fourth edge line, corresponding to edge information of the image obtained by using a result of the fourth Radon transform.

24. A non-transitory computer readable recording medium having recorded thereon a program executable by a computer for performing the method of claim 13.

25. A method of processing a radiograph for detecting a region of interest (ROI) of the radiograph, the method comprising:

sensing at least one first edge line based on a Hough-transformed image;

performing a first Radon transform on a region in which the at least one first edge line is sensed; and obtaining, as a first collimation line, an edge line from among the at least one first edge line based on a result of the first Radon transform.

26. A non-transitory computer readable recording medium having recorded thereon a program executable by a computer for performing the method of claim 25.

* * * * *